United States Patent [19]
Patel

[11] Patent Number: 5,352,497
[45] Date of Patent: Oct. 4, 1994

[54] SORBENT PADS FOR HAZARDOUS WASTES

[75] Inventor: Kirit Patel, Bensalem, Pa.

[73] Assignee: Leucadia, Inc., La Jolla, Calif.

[21] Appl. No.: 830,648

[22] Filed: Feb. 4, 1992

[51] Int. Cl.$^5$ .............................................. B32B 5/00
[52] U.S. Cl. ..................... 428/34.1; 428/227; 428/233; 428/287; 428/910; 428/194; 428/247; 428/255; 206/205
[58] Field of Search ............... 428/227, 233, 285, 287, 428/288, 289, 290, 300, 301, 284, 255, 286, 246, 247, 248, 910; 405/128, 129, 38, 55, 270; 604/358, 378; 588/249, 250, 259; 206/205, 370, 366

[56] References Cited

U.S. PATENT DOCUMENTS

| | | | |
|---|---|---|---|
| 2,902,395 | 9/1959 | Hirschy | 428/255 |
| 3,085,309 | 4/1963 | Olson | 428/255 |
| 3,989,867 | 11/1976 | Sisson | 428/132 |
| 4,107,051 | 8/1978 | Lorentzen | 428/255 |
| 4,130,683 | 12/1978 | Michel | 428/194 |
| 4,206,570 | 6/1980 | Cooper | 47/71 |
| 4,224,366 | 9/1980 | McCabe, Jr. | 428/72 |
| 4,265,956 | 5/1981 | Colijn | 428/255 |
| 4,338,371 | 7/1982 | Dawn et al. | 428/283 |
| 4,360,021 | 11/1982 | Stima | 128/287 |
| 4,713,068 | 12/1987 | Wang et al. | 604/366 |
| 4,815,963 | 3/1989 | Berkhout | 405/129 |
| 4,861,632 | 8/1989 | Caggiano | 428/33.2 |
| 4,982,861 | 1/1991 | de Groot et al. | 220/89.1 |

Primary Examiner—Ellis P. Robinson
Assistant Examiner—Michael A. Williamson
Attorney, Agent, or Firm—Lucas & Just

[57] ABSTRACT

A sorbent pad for protection against environmental damage by drums of hazardous waste is disclosed. The sorbent pad comprises sorbent fibers and, on the bottom, a barrier layer. The drum rests on the sorbent pad and any spills or condensation are sorbed by the sorbent pad. The barrier layer prevents any sorbed material from leaching through to the pallet, floor, etc. on which the drum rests.

16 Claims, 1 Drawing Sheet

SORBENT PADS FOR HAZARDOUS WASTES

The present invention relates to products for the safe transportation, storage and disposal of hazardous wastes and is of special interest for controlling the contamination of pallets, steel storage racks, industry floors, soil and highways.

Hazardous wastes generally include liquids and, as a result, are most often transported in steel drums. For reasons of economy, the steel drums are typically reused or are recycled from an earlier use. Because of this, the drums frequently are not completely tightly sealed, either because of damage to the drum lip or the top, misshape of the sealing ring, an incompletely tightened bung hole cap, or the like. Furthermore, many hazardous wastes are corrosive and cause pinholes, or worse, in the exterior of the drum. Yet another problem is that the surface of the drum can become contaminated as the drum is filled and ambient temperature cycling can cause water condensation and subsequent run-off from the sides of the drum.

SUMMARY OF THE INVENTION

All of the foregoing can contribute to pollution of the surface on which the drum is sitting, such as a pallet, a storage rack, a warehouse floor or the like. The present invention relates to a sorbent pad which can be positioned under such drums for the purpose of reducing or eliminating contamination due to spillage or leakage from the drum. While the principal purpose of the pad of the present invention is to be used in connection with drums which contain hazardous waste, it will be appreciated that the pad of the present invention can also be advantageously used with other liquid-containing drums which might cause pollution, such as oil drums, cleaner fluid drums, etc.

In accordance with the present invention, a sorbent pad is composed of a main blanket comprising sorbent fibers and a liquid impervious barrier layer throughout one face thereof. The sorbent pad further preferably comprises a reinforcing material such as a net, and a sealing material along the edges. The sealing material along the edges is primarily for the purpose of keeping the fibers in the blanket from coming loose from the pad and causing dust, but can also be used for the purpose of preventing any liquid sorbed by the pad from leaching out through the edges.

BRIEF DESCRIPTION OF THE DRAWINGS

These and other aspects of the present invention may be more fully understood with reference to the accompanying drawings wherein.

DETAILED DESCRIPTION OF INVENTION

Figure 1:
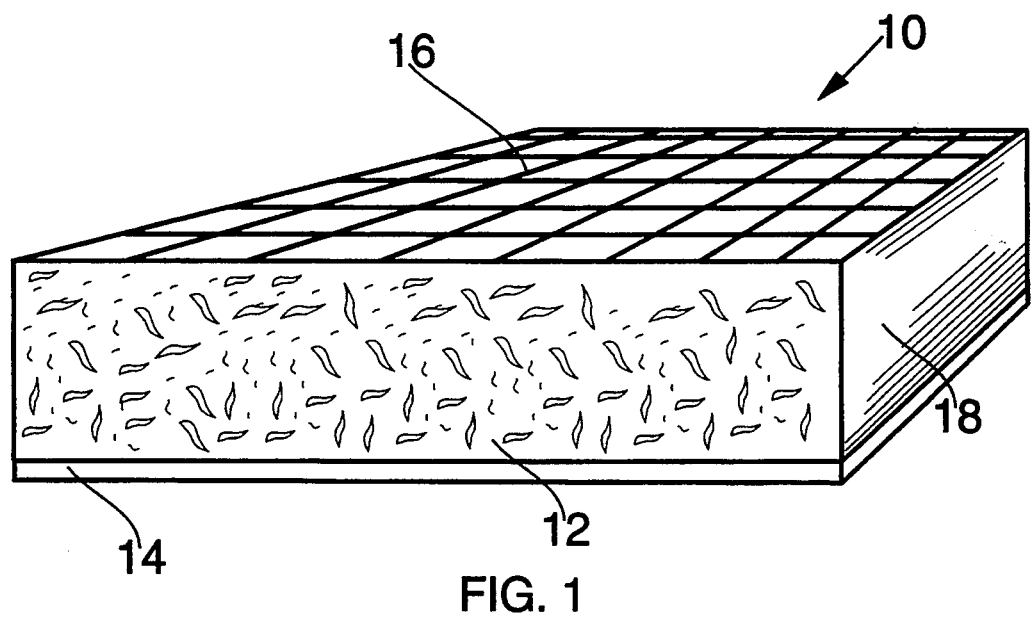
FIG. 1 shows a pad according to the present invention.

Referring first to FIG. 1, there is shown a sorbent pad 10 which comprises fiber blanket 12 and barrier layer 14. The pad 10 is also shown with a reinforcing net 16 on the top thereof. The purpose of the net 16 is twofold. It adds strength to the overall sorbent pad 10, and it also distributes the load of a drum (see FIG. 2) placed on top thereof. While specific reference has been made to a net, it will be understood that other reinforcing means, such as a woven or non-woven and/or coated fabric, could be used. It will also be appreciated that the reinforcing member 16 need not be used or, if used, can be positioned on the top of the product as shown, or in the middle of the product, or adjacent to the barrier layer, either above it or below it. Indeed, the reinforcing member 16 can be integral with the barrier layer 14. It will be still further appreciated that more than one reinforcing member can be used, e.g. a net can be integral with the barrier layer 14 and another net can be affixed to the top of the sorbent pad. If the reinforcing member 16 is positioned on top of the sorbent pad as shown in FIG. 1, it should be pervious to liquid so that liquid can be sorbed into the fiber blanket 12.

The fibers which are useful in the fiber blanket of the present invention are any fibers which will absorb or adsorb the liquid against which protection is sought. It will be appreciated that the particular fibers must necessarily be chosen on the basis of the end use application. For example, if it is acid waste that is being transported, then acid resistant fibers should be employed. Similarly, if hydrocarbons are being transported, then hydrocarbon resistant fibers should be employed. Typical fibers which can be used include both natural fibers and synthetic fibers; however, it is preferred that at least 50% of the fibers be natural fibers, and very good results have been obtained when substantially 100% of the fibers are of natural origin. The natural fibers may typically be wood fibers, bleachboard, paper, textile waste fibers or any combination of the foregoing. Suitable wood fibers are those which are inexpensive, and at the present time include southern yellow pine and poplar. Suitable bleachboard and paper fibers include recycled paper packaging material and sulfite paper pulp. Suitable textile waste fibers include recycled thread waste. Synthetic fibers which are useful include polypropylene fibers and polyethylene fibers. Depending on the fibers selected for use, they can be treated for water repellency, fire retardancy or the like.

As stated above, the barrier layer 14 must be impervious to the liquid being transported or stored. Typical barrier layers which are effective with most liquids are polyester films, aluminum foil, Mylar, polyethylene terephthalate, polyethylene films, polypropylene films, and densely packed woven or non-woven and/or coated fabrics.

As further illustrated in FIG. 1, a coating 18 can be applied to the edges of the sorbent pad. While coating 18 is only shown on one edge, it will be appreciated that it can be used on all edges. Furthermore, while it is shown extending from the bottom edge to the top edge of the pad, it will be appreciated that it need not be throughout this dimension.

The primary purpose of the coating 18 is to "seal" the fibers so that they do not come loose from the blanket and cause "dust." However, the coating can also be made impervious to the liquid being sorbed so that any sorbed liquid is trapped within the fiber blanket 12. Suitable materials for the coating 18 include liquid thermoplastics, white glue and the like. While it is preferred that layer 18 be a coating, it will be appreciated that it could be a film, e.g. an extension of a film used for barrier layer 14. By proper "tucking" (not shown) of the edges of the film, a liquid impervious barrier can be formed on the sides as well as the bottom.

Figure 2:
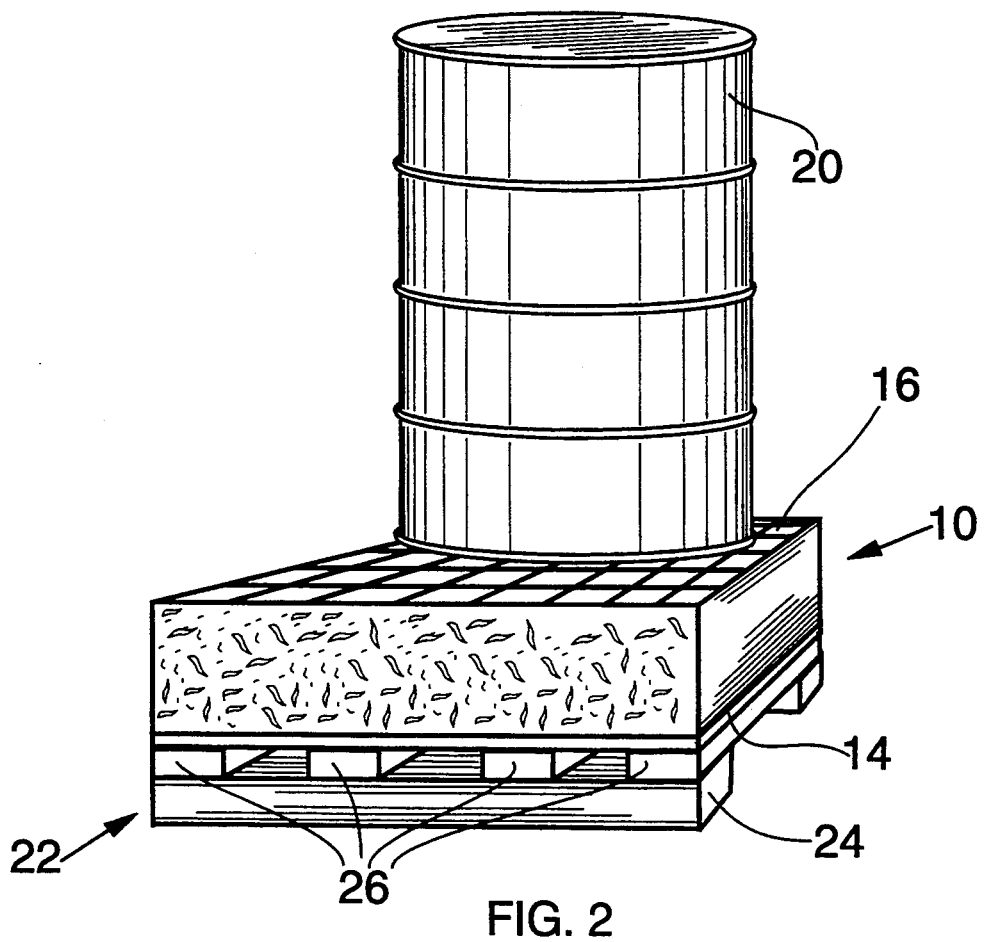
FIG. 2 shows the sorbent pad of FIG. 1 in combination with a liquid-containing drum and a pallet.

FIG. 2 shows the pad 10 of FIG. 1 with a drum 20 containing liquid (not shown) therewithin. As shown, the drum 20 rests on net 16 of pad 10 and its weight is distributed across the pad 10 by the net 16. The pad, in turn, rests on a pallet 22 comprising main runners 24 and slats 26.

The size of the sorbent pad will vary depending upon the particular application. In general, however, a nominal size of 42 inches to 48 inches is preferred, with a thickness of ¼ to 6 inches. While square or rectangular shapes are preferred because of their ease of manufacture, other shaped pads are also within the contemplation of the present invention.

Sorbent pads made according to the present invention may be recycled for further use. Ultimately, however, they must be discarded. For disposal purposes, it is preferred that all of the materials chosen for the sorbent pad, including the fibers of the blanket, the barrier layer, and the reinforcing member (if used) be burnable so that, after use, the sorbent pad can be readily incinerated and completely consumed.

In the best mode contemplated by the inventor for a standard 55-gallon drum, a sorbent pad of approximately 48×44 inches is employed. The pad has a nominal thickness of ⅜ inch. The fibers are 100% cellulose fibers, predominantly bleachboard. The barrier layer is a polyethylene film of approximately 3 millimeter thickness and covers one entire face (the bottom) of the pad. The opposed face (the top) of the pad is covered by a biaxially oriented polypropylene net having strands of approximately 4 per inch in each direction and a weight of about 4 pounds/1000 square feet. All four edges of the fiber blanket are sealed with a thermoplastic coating to retain the fibers in the blanket.

It will be understood that the claims are intended to cover all changes and modifications of the preferred embodiments of the invention herein chosen for the purpose of illustration which do not constitute a departure from the spirit and scope of the invention.

What is claimed is:

1. A sorbent pad for sorption of at least one liquid comprising a pad for placement under a container of liquid hazardous waste, said pad further comprising:
   (a) a fiber blanket having a top face and a bottom face and sidewalls which extend from said top face to said bottom face, said blanket comprising fibers which are chemically resistant to said liquid hazardous waste;
   (b) a barrier layer affixed to said bottom face of said blanket and completely covering said bottom face of said blanket, said barrier layer being impervious to said liquid hazardous waste;
   (c) a biaxially oriented polypropylene net on said top face of said blanket and completely covering said top face of said blanket, said net providing strength to said blanket and for distributing the weight of the container; and
   (d) a thermoplastic coating which completely coats the exterior edges of said sidewalls of said blanket, said thermoplastic coating being impervious to said liquid hazardous waste.

2. The sorbent pad of claim 1 wherein the fibers in the fiber blanket comprise at least 50% natural fibers.

3. The sorbent pad of claim 1 wherein the fibers in the fiber blanket are substantially 100% natural fibers.

4. The sorbent pad of claim 1 wherein the fibers in the fiber blanket comprise at least 50% synthetic fibers.

5. The sorbent pad of claim 1 wherein the fibers in the fiber blanket are substantially 100% synthetic fibers.

6. The sorbent pad of claim 2 wherein the natural fibers are selected from the group consisting of wood fibers, bleachboard fibers, paper fibers and textile waste fibers.

7. The sorbent pad of claim 1 wherein the barrier layer is selected from the group consisting of polyester film, aluminum foil, polyethylene film, polypropylene film, densely packed non-woven fabrics, densely packed woven fabrics and coated fabrics.

8. The sorbent pad of claim 1 wherein the barrier layer is polyethylene terephthalate.

9. In combination, a container holding liquid hazardous waste and a sorbent pad positioned beneath said container, said pad comprising:
   (a) a fiber blanket having a top face and a bottom face and sidewalls which extend from said top face and said bottom face, said blanket comprising fibers which are chemically resistant to said liquid hazardous waste;
   (b) a barrier layer affixed to said bottom face of said blanket and completely covering said bottom face of said blanket, said barrier layer being impervious to said liquid hazardous waste;
   (c) a biaxially oriented polypropylene net on said top face of said blanket and completely covering said top face of said blanket, said net providing strength to said blanket and for distributing the weight of the container; and
   (d) a thermoplastic coating which completely coats the exterior edges of said sidewalls of said blanket, said thermoplastic coating being impervious to said liquid hazardous waste.

10. The combination of claim 9 wherein the fibers in the fiber blanket comprise at least 50% natural fibers.

11. The combination of claim 9 wherein the fibers in the fiber blanket are substantially 100% natural fibers.

12. The combination of claim 9 wherein the fibers in the fiber blanket comprise at least 50% synthetic fibers.

13. The combination of claim 9 wherein the fibers in the fiber blanket are substantially 100% synthetic fibers.

14. The combination of claim 10 wherein the natural fibers are selected from the group consisting of wood fibers, bleachboard fibers, paper fibers and textile waste fibers.

15. The combination of claim 9 wherein the barrier layer is selected from the group consisting of polyester film, aluminum foil, film, polyethylene film, polypropylene film, densely packed non-woven fabrics, densely packed woven fabrics and coated fabrics.

16. The combination of claim 9 wherein the barrier layer is polyethylene terephthalate.

* * * * *

UNITED STATES PATENT AND TRADEMARK OFFICE
CERTIFICATE OF CORRECTION

PATENT NO. : 5,352,497
DATED : October 4, 1994
INVENTOR(S) : Kirit Patel

It is certified that error appears in the above-identified patent and that said Letters Patent is hereby corrected as shown below:

Column 4, line 24 (claim 9), change "and" (second instance) to --to--.

Column 4, line 55 (claim 15), delete "film,".

Signed and Sealed this

Twenty-ninth Day of November, 1994

Attest:

BRUCE LEHMAN

Attesting Officer

Commissioner of Patents and Trademarks